US011075391B2

(12) United States Patent
Wang et al.

(10) Patent No.: US 11,075,391 B2
(45) Date of Patent: Jul. 27, 2021

(54) METHOD FOR PREPARING MODULAR PLANAR INTERCONNECT PLATE, MODULAR PLANAR INTERCONNECT PLATE ASSEMBLY INCLUDING THE INTERCONNECT PLATE, AND STAMPING ASSEMBLY FOR PREPARING THE INTERCONNECT PLATE

(71) Applicants:National Taipei University of Technology, Taipei (TW); Ceram Energy Technology Co., Ltd., Taoyuan (TW)

(72) Inventors: Sea-Fue Wang, Taipei (TW); Fan-Ping Chen, Taoyuan (TW); Hsi-Chuan Lu, Taipei (TW)

(73) Assignees: National Taipei University of Technology, Taipei (TW); Ceram Energy Technology Co., Ltd., Taoyuan (TW)

( * ) Notice: Subject to any disclaimer, the term of this patent is extended or adjusted under 35 U.S.C. 154(b) by 91 days.

(21) Appl. No.: 16/437,863

(22) Filed: Jun. 11, 2019

(65) Prior Publication Data
US 2020/0266455 A1     Aug. 20, 2020

(30) Foreign Application Priority Data
Feb. 14, 2019   (TW) ................................ 108104954

(51) Int. Cl.
*H01M 8/026*     (2016.01)
*H01M 8/0206*    (2016.01)
(Continued)

(52) U.S. Cl.
CPC ......... *H01M 8/026* (2013.01); *H01M 8/0206* (2013.01); *H01M 8/0258* (2013.01);
(Continued)

(58) Field of Classification Search
CPC .. H01M 8/026; H01M 8/2483; H01M 8/0206; H01M 8/12; H01M 2008/1293
See application file for complete search history.

(56) References Cited

U.S. PATENT DOCUMENTS 5,795,665 A  *  8/1998  Allen ................... H01M 8/0625
                                                       429/460
2004/0209150 A1    10/2004  Rock et al.

FOREIGN PATENT DOCUMENTS

EP      1324416 A2  *  7/2003  .......... H01M 8/0258
TW       481937 B       4/2002

* cited by examiner

*Primary Examiner* — Maria Laios
*Assistant Examiner* — Brett M Hostert
(74) *Attorney, Agent, or Firm* — Birch, Stewart, Kolasch & Birch, LLP

(57) ABSTRACT

A method for preparing a modular planar interconnect plate for a solid oxide fuel cell includes the steps of: (a) providing a metal blank sheet, (b) stamping a main region of the metal blank sheet to form a plurality of columns of upper protrusions on an upper surface of the main region of the metal blank sheet and a plurality of columns of lower depressions on a lower surface of the main region of the metal blank sheet, and (c) stamping the main region of the metal blank sheet to form a plurality of rows of lower protrusions on a lower surface of the main region of the metal blank sheet and a plurality of rows of upper depressions on the upper surface of the main region of the metal blank sheet.

6 Claims, 14 Drawing Sheets

(51) Int. Cl.
  *H01M 8/2483*  (2016.01)
  *H01M 8/12*  (2016.01)
  *H01M 8/2425*  (2016.01)
  *H01M 8/0258*  (2016.01)
  *H01M 8/124*  (2016.01)
(52) U.S. Cl.
  CPC ............ *H01M 8/12* (2013.01); *H01M 8/2425* (2013.01); *H01M 8/2483* (2016.02); *H01M 2008/1293* (2013.01)

METHOD FOR PREPARING MODULAR PLANAR INTERCONNECT PLATE, MODULAR PLANAR INTERCONNECT PLATE ASSEMBLY INCLUDING THE INTERCONNECT PLATE, AND STAMPING ASSEMBLY FOR PREPARING THE INTERCONNECT PLATE

CROSS-REFERENCE TO RELATED APPLICATION

This application claims priority of Taiwanese Invention Patent Application No. 108104954, filed on Feb. 14, 2019.

FIELD

This disclosure relates to a method for preparing a modular planar interconnect plate, and more particularly to a method for preparing a modular planar interconnect plate for a solid oxide fuel cell. This disclosure also relates to a modular planar interconnect plate assembly including the modular planar interconnect plate, and a stamping assembly for preparing the modular planar interconnect plate.

BACKGROUND

A fuel cell is a device that converts chemical energy from a fuel into electricity through a chemical reaction of positively charged hydrogen ions with oxygen or another oxidizing agent. The fuel cell can produce electricity continuously as long as fuel and oxygen or air are supplied continuously. Particularly, a planar solid oxide fuel cell (referred to as a planar SOFC hereinafter) is more popular in various applications because it has advantages of durable stability and low production cost and because a plurality of the planar SOFCs may be stacked and electrically connected in series to produce high voltage.

A planar interconnect plate for a solid oxide fuel cell is configured to separate a fuel fluid of a planar cell unit from an oxygen-containing fluid of an adjacent planar cell unit. Conventional techniques as disclosed, for example, in Taiwanese Patent No. TW 1586027, usually form fluid channels on two opposite surfaces of each of the planar interconnect plates through mechanical engraving, such that the fuel fluid and the oxygen-containing fluid passing through the fluid channels may make contact with the planar cell units, correspondingly. However, the planar interconnect plate to be machined by mechanical engraving needs to be relatively thick. In addition, mechanical engraving is a process that takes a relatively long processing time and thus is costly.

SUMMARY

Therefore, a first object of the disclosure is to provide a method for preparing a modular planar interconnect plate for a solid oxide fuel cell so as to alleviate or eliminate the aforesaid shortcoming of the conventional techniques for preparing a planar interconnect plate. A second object of the disclosure is to provide a modular planar interconnect plate assembly including the modular planar interconnect plate thus prepared. A third object of the disclosure is to provide a stamping assembly for preparing the modular planar interconnect plate.

According to a first aspect of the disclosure, a method for preparing a modular planar interconnect plate, which is used for a solid oxide fuel cell and which is formed with a plurality of upper main channels extending in a longitudinal direction and displaced from each other in a transverse direction, and a plurality of lower main channels extending in the transverse direction and displaced from each other in the longitudinal direction, includes the steps of:

(a) providing a metal blank sheet which has a main region, and a circumferential region surrounding the main region;

(b) stamping the main region of the metal blank sheet to form a plurality of columns of upper protrusions on an upper surface of the main region of the metal blank sheet, the columns of the upper protrusions being displaced from each other in the transverse direction such that two adjacent ones of the columns of the upper protrusions define in-between a corresponding one of the upper main channels, each of the columns of the upper protrusions including a plurality of the upper protrusions which are displaced from each other in the longitudinal direction, and a plurality of columns of lower depressions on a lower surface of the main region of the metal blank sheet, the columns of the lower depressions being displaced from each other in the transverse direction, each of the columns of the lower depressions including a plurality of the lower depressions which are displaced from each other in the longitudinal direction; and (c) stamping the main region of the metal blank sheet to form a plurality of rows of lower protrusions on a lower surface of the main region of the metal blank sheet, the rows of the lower protrusions being displaced from each other in the longitudinal direction such that two adjacent ones of the rows of the lower protrusions define in-between a corresponding one of the lower main channels, each of the rows of the lower protrusions including a plurality of the lower protrusions which are displaced from each other in the transverse direction, and a plurality of rows of the upper depressions on the upper surface of the main region of the metal blank sheet, the rows of the upper depressions being displaced from each other in the longitudinal direction, each of the rows of the upper depressions including a plurality of the upper depressions which are displaced from each other in the transverse direction.

According to a second aspect of the disclosure, a modular planar interconnect plate assembly for a solid oxide fuel cell includes:

a modular planar interconnect plate prepared by the method of the disclosure;

a pair of upper elongation plates each of which includes a top surface and a bottom surface, and each of which has a length slightly larger than the first pre-determined distance so as to permit the upper elongation plates to be respectively retained between the front and rear upper retaining protrusion units of a right side area and between the front and rear upper retaining protrusion units of a left side area, each of the upper elongation plates having in the bottom surface a plurality of first grooves which are displaced from each other in a lengthwise direction and which are arranged such that the first grooves are fluidly communicated with the upper main channels and such that the top surface of each of the upper elongation plates is flush with the topmost of each of the upper protrusions; and a pair of lower elongation plates each of which includes a top surface and a bottom surface, and each of which has a length slightly larger than the second pre-determined distance so as to permit the lower elongation plates to be respectively retained between the right and left lower retaining protrusion units of a front side area and between the right and left lower retaining protrusion units of a rear side area, each of the lower elongation plates having in the top surface a plurality of second grooves which are displaced from each other in a lengthwise direction and which are arranged such that the second grooves are fluidly communicated with the lower main channels and such that the bottom surface of each of the lower elongation plates is flush with the bottommost of each of the lower protrusions.

According to a third aspect of the disclosure, a modular planar interconnect plate assembly for a solid oxide fuel cell includes:
- a modular planar interconnect plate prepared by the method of the disclosure;
- a pair of upper elongation plates each of which includes a top surface and a bottom surface, and each of which has a length not larger than the first pre-determined distance, each of the upper elongation plates having in the bottom surface a plurality of first grooves which are displaced from each other in a lengthwise direction and which are arranged such that the first grooves are fluidly communicated with the upper main channels and such that the top surface of each of the upper elongation plates is flush with the topmost of each of the upper protrusions;
- a pair of lower elongation plates each of which includes a top surface and a bottom surface, and each of which has a length not larger than the second pre-determined distance, each of the lower elongation plates having in the top surface a plurality of second grooves which are displaced from each other in a lengthwise direction and which are arranged such that the second grooves are fluidly communicated with the lower main channels and such that the bottom surface of each of the lower elongation plates is flush with the bottommost of each of the lower protrusions;
- a pair of upper lug inserts each of which is disposed to join to a corresponding one of two ends of each of the upper elongation plates with an upper juncture region, the upper juncture region being configured to have a smaller width so as to permit the upper juncture region to be fitted between the upper retaining protrusions of each of the front upper retaining protrusion unit and the rear upper retaining protrusion unit; and
- a pair of lower lug inserts each of which is disposed to join to a corresponding one of two ends of each of the lower elongation plates with a lower juncture region, the lower junction region being configured to have a smaller width so as to permit the lower juncture region to be fitted between the lower retaining protrusions of each of the right lower retaining protrusion unit and the left lower retaining protrusion unit.

According to a fourth aspect of the disclosure, a stamping assembly for preparing a modular planar interconnect plate for a solid oxide fuel cell includes an upper die, a lower die, a plurality of first pins, and a plurality of second pins.

The upper die includes an upper surface, a lower surface opposite to the upper surface, a plurality of columns of lower depressions on the lower surface, and a plurality of columns of first guiding holes extending from the lower surface to the upper surface. The columns of the lower depressions are displaced from each other in a transverse direction. Each of the columns of the lower depressions includes a plurality of the lower depressions which are displaced from each other in a longitudinal direction. Each of the columns of the first guiding holes is disposed between two adjacent ones of the columns of the lower depressions and includes a plurality of the first guiding holes that are staggered with the lower depressions of an adjacent one of the columns of the lower depressions.

The lower die includes a top surface, a bottom surface opposite to the top surface, a plurality of columns of top depressions disposed on the top surface, and a plurality of columns of second guiding holes extending from the bottom surface to the top surface. Each of the top depressions is disposed to register with a corresponding one of the first guiding holes. Each of the second guiding holes is disposed to register with a corresponding one of the lower depressions.

Each of the first pins has a first pin head and a first pin body, and is brought into fitting engagement with a corresponding one of the first guiding holes while permitting the first pin head to extend outwardly of the lower surface of the upper die by a first predetermined length.

Each of second pins has a second pin head and a second pin body, and is brought into fitting engagement with a corresponding one of the second guiding holes while permitting the second pin head to extending outwardly of the top surface of the lower die by a second predetermined length.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
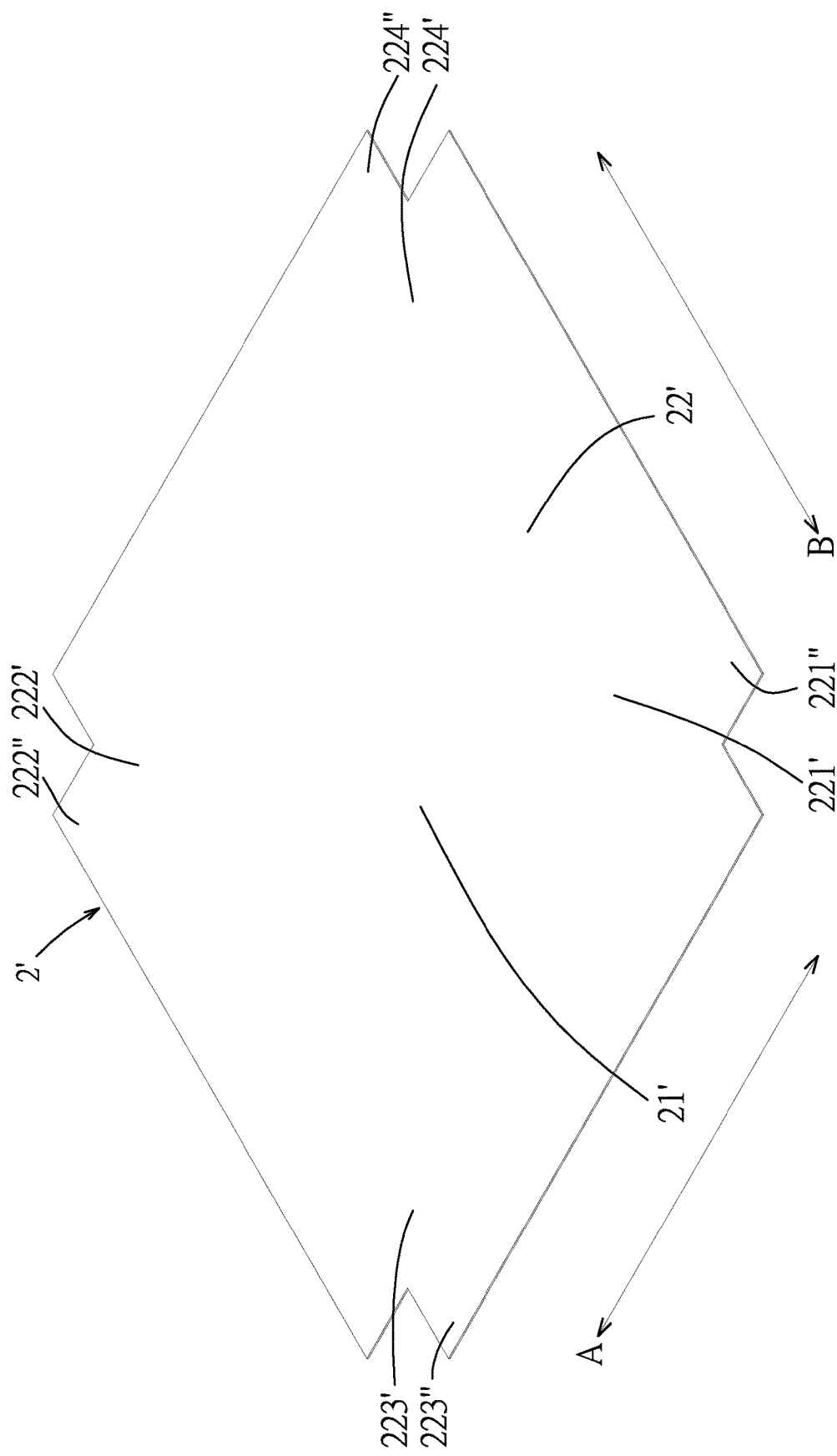
FIG. 1 is a perspective view of a metal blank sheet for an embodiment of a method for preparing a modular planar interconnect plate according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4 is an embodiment of a method for preparing a modular planar interconnect plate 2. The modular planar interconnect plate 2 is used for a solid oxide fuel cell and is formed with a plurality of upper main channels 211 extending in a longitudinal direction (A) and displaced from each other in a transverse direction (B), and a plurality of lower main channels 221 extending in the transverse direction (B) and displaced from each other in the longitudinal direction (A). The method for preparing the modular planar interconnect plate 2 includes the steps of:

(a) providing a metal blank sheet 2' which has a main region 21';

(b) stamping the main region 21' of the metal blank sheet 2' to form a plurality of columns of upper protrusions 213 on an upper surface of the main region 21' of the metal blank sheet 2' and a plurality of columns of lower depressions 224 on a lower surface of the main region 21' of the metal blank sheet 2'; and (c) stamping the main region 21' of the metal blank sheet 2' to form a plurality of rows of lower protrusions 223 on a lower surface of the main region 21' of the metal blank sheet 2' and a plurality of rows of upper depressions 214 on the upper surface of the main region 21' of the metal blank sheet 2'.

The metal blank sheet 2' further has a circumferential region 22' surrounding the main region 21'. The circumferential region 22' includes a right side area 221', a left side area 222' opposite to the right side area 221' in the longitudinal direction (A), a front side area 223', and a rear side area 224' opposite to the front side area 223' in the transverse direction (B).

As described above, in step (b), the main region 21' of the metal blank sheet 2' is stamped to form the columns of the upper protrusions 213 on the upper surface of the main region 21' of the metal blank sheet 2'. The columns of the upper protrusions 213 are displaced from each other in the transverse direction (B) such that two adjacent ones of the columns of the upper protrusions 213 define in-between a corresponding one of the upper main channels 211. Each of the columns of the upper protrusions 213 includes a plurality of the upper protrusions 213 which are displaced from each other in the longitudinal direction (A). Each of the upper protrusions 213 of one of the columns of the upper protrusion 213 is of the same dimension as and aligned with corresponding ones of the upper protrusions 213 of the remaining columns of the upper protrusions 213 so as to form a plurality of rows of the upper protrusions 213 on the upper surface of the main region 21' of the metal blank sheet 2'. The rows of the upper protrusions 213 are displaced from each other in the longitudinal direction (A) such that two adjacent ones of the rows of the upper protrusions 213 define in-between one of a plurality of upper auxiliary channels 212 transverse to the upper main channels 211.

As described above, the columns of the lower depressions 224 are formed on the lower surface of the main region 21' of the metal blank sheet 2'. In addition, the columns of the lower depressions 224 are displaced from each other in the transverse direction (B). Each of the columns of the lower depressions 224 includes a plurality of the lower depressions 224 which are displaced from each other in the longitudinal direction (A).

In step (b), the metal blank sheet 2' is further formed with a front upper retaining protrusion unit 215 and a rear upper retaining protrusion unit 216 on an upper surface of each of the right side area 221' and the left side area 222' of the circumferential region 22' of the main region 21'. The front upper retaining protrusion unit 215 and the rear upper retaining protrusion unit 216 are spaced apart from each other in the transverse direction (B) by a first predetermined distance. Each of the front upper retaining protrusion unit 215 and the rear upper retaining protrusion unit 216 includes a pair of upper retaining protrusions.

As described above, in step (c), the main region 21' of the metal blank sheet 2' is stamped to form the rows of the lower protrusions 223 on the lower surface of the main region 21' of the metal blank sheet 2'. The rows of the lower protrusions 223 are displaced from each other in the longitudinal direction (A) such that two adjacent ones of the rows of the lower protrusions 223 define in-between a corresponding one of the lower main channels 221. Each of the rows of the lower protrusions 223 includes a plurality of the lower protrusions 223 which are displaced from each other in the transverse direction (B). Each of the lower protrusions 223 of one of the rows of the lower protrusion 223 is of the same dimension as and aligned with corresponding ones of the lower protrusions 223 of the remaining rows of the lower protrusions 223 so as to form a plurality of columns of the lower protrusions 223 on the lower surface of the main region 21' of the metal blank sheet 2'. The columns of the lower protrusions 223 are displaced from each other in the transverse direction (B) such that two adjacent ones of the columns of the lower protrusions 223 define in-between one of a plurality of lower auxiliary channels 222 transverse to the lower main channels 221.

As described above, the rows of the upper depressions 214 are formed on the upper surface of the main region 21' of the metal blank sheet 2'. In addition, the rows of the upper depressions 214 are displaced from each other in the longitudinal direction (A). Each of the rows of the upper depressions 214 includes a plurality of the upper depressions 214 which are displaced from each other in the transverse direction (B).

The upper depressions 214 of each of the rows of the upper depressions 214 are staggered with the upper protrusions 213 of an adjacent one of the rows of the upper protrusions 213, and the lower depressions 224 of each of the columns of the lower depressions 224 are staggered with the lower protrusions 223 of an adjacent one of the columns of the lower protrusions 223 so as to permit both step (b) and step (c) to be implemented simultaneously.

In step (c), the metal blank sheet 2' is further formed with a right lower retaining protrusion unit 225 and a left lower retaining protrusion unit 226 on a lower surface of each of the front side area 223' and the rear side area 224' of the circumferential region 22' of the main region 21'. The right lower retaining protrusion unit 225 and the left lower retaining protrusion unit 226 are spaced apart from each other in the longitudinal direction (A) by a second predetermined distance. Each of the right lower retaining protrusion unit 225 and the left lower retaining protrusion unit 226 includes a pair of lower retaining protrusions.

Figure 2:
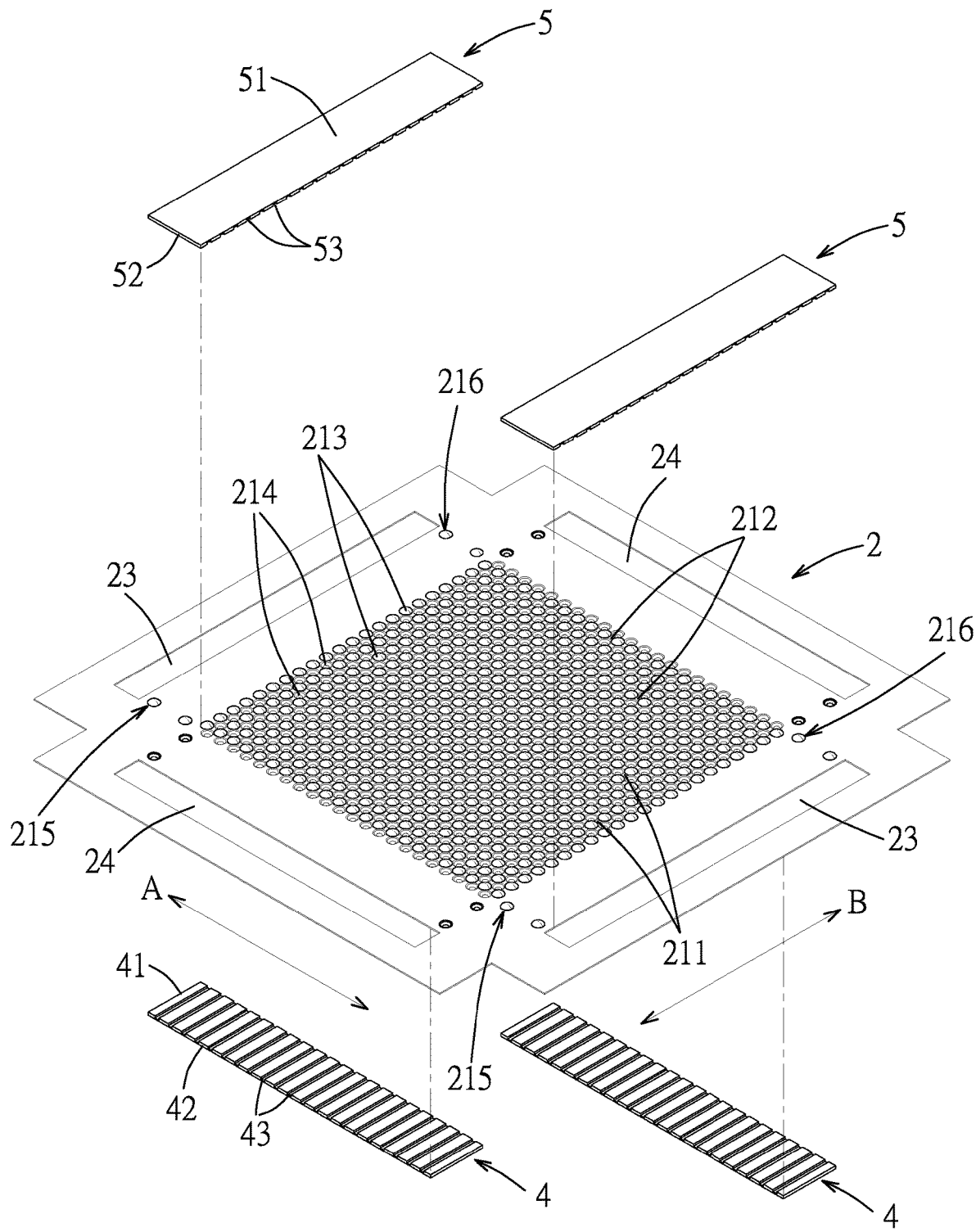
FIG. 2 is a perspective exploded view of a first embodiment of a modular planar interconnect plate assembly according to the disclosure.
Figure 3:
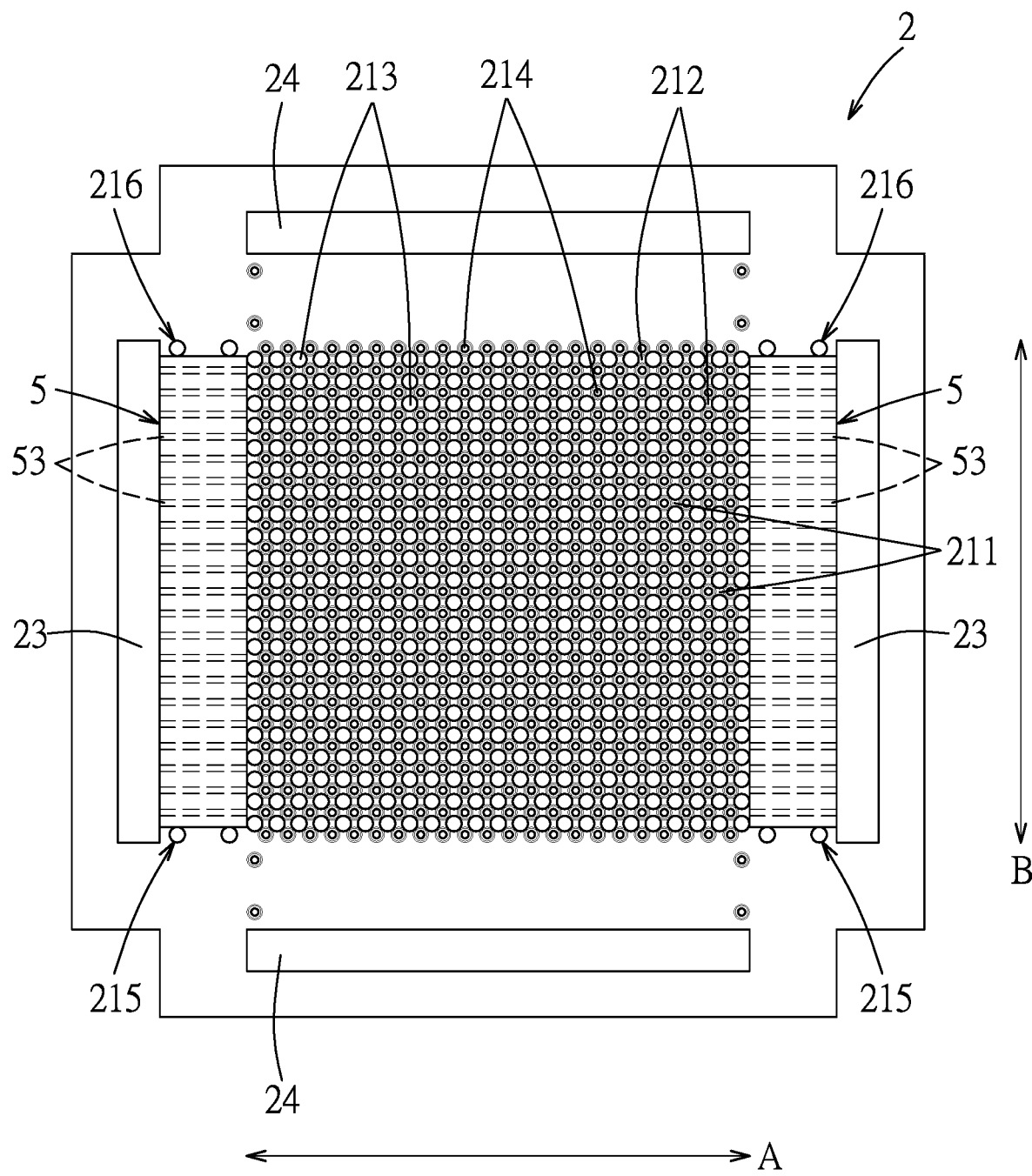
FIG. 3 is schematic top view of the first embodiment of the modular planar interconnect plate assembly according to the disclosure.
Figure 4:
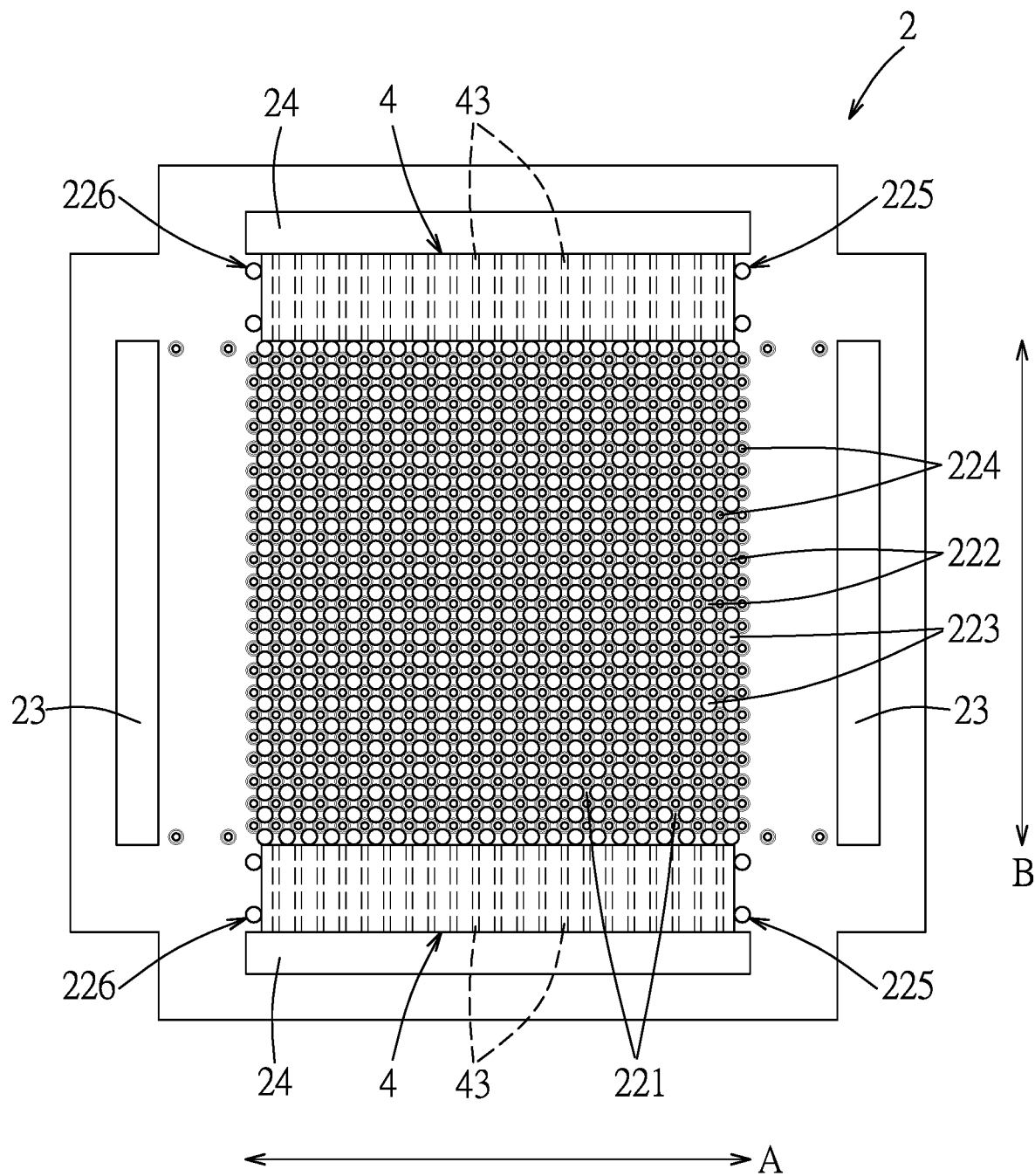
FIG. 4 is a schematic bottom view of the first embodiment of the modular planar interconnect plate assembly according to the disclosure.

Referring to FIGS. 2 to 4, a first embodiment of a modular planar interconnect plate assembly for a solid oxide fuel cell according to the disclosure includes a modular planar interconnect plate 2 prepared by the embodiment of the method according to the disclosure described above, a pair of upper elongation plates 5, and a pair of lower elongation plates 4.

In the first embodiment of the modular planar interconnect plate assembly, each of the upper elongation plates 5 includes a top surface 51 and a bottom surface 52, and has a length slightly larger than the first pre-determined distance so as to permit the upper elongation plates 5 to be respectively retained between the front and rear upper retaining protrusion units 215, 216 of the right side area 221' and between the front and rear upper retaining protrusion units 215, 216 of the left side area 222'. Each of the upper elongation plates 5 has, in the bottom surface 52, a plurality of first grooves 53 which are displaced from each other in a lengthwise direction and which are arranged such that the first grooves 53 are fluidly communicated with and respectively aligned with the upper main channels 211 and such that the top surface 51 of each of the upper elongation plates 5 is flush with the topmost of each of the upper protrusions 213.

In the first embodiment of the modular planar interconnect plate assembly, each of the lower elongation plates 4 includes a top surface 41 and a bottom surface 42, and has a length slightly larger than the second pre-determined distance so as to permit the lower elongation plates 4 to be respectively retained between the right and left lower retaining protrusion units 225, 226 of the front side area 223' and between the right and left lower retaining protrusion units 225, 226 of the rear side area 224'. Each of the lower elongation plates 4 has, in the top surface 41, a plurality of second grooves 43 which are displaced from each other in a lengthwise direction and which are arranged such that the second grooves 43 are fluidly communicated with and respectively aligned with the lower main channels 221 and such that the bottom surface 42 of each of the lower elongation plates 4 is flush with the bottommost of each of the lower protrusions 223.

The modular planar interconnect plate 2 further includes a pair of first slots 23 and a pair of second slots 24. The first slots are formed in aright marginal area 221" and a left marginal area 222" that are disposed rightwardly and leftwardly of the right side area 221' and the left side area 222', respectively, for providing an oxygen-containing fluid for the upper main channels 211 through the first grooves 53. The second slots 24 are formed in a front marginal area 223" and a rear marginal area 224" that are disposed frontwardly and rearwardly of the front side area 223' and the rear side 224', respectively, for providing a fuel fluid for the lower main channels 221 through the second grooves 43.

The modular planar interconnect plate 2, the upper elongation plates 5, and the lower elongation plates 4 are made from a stainless steel material such as SUS 430, SUS 431, SUS 441, Crofer® 22, and the like. In the first embodiment of the modular planar interconnect plate assembly, the modular planar interconnect plate 2, the upper elongation plates 5, and the lower elongation plates 4 are formed separately. Alternatively, they may be formed as a single-piece configuration.

Figure 5:
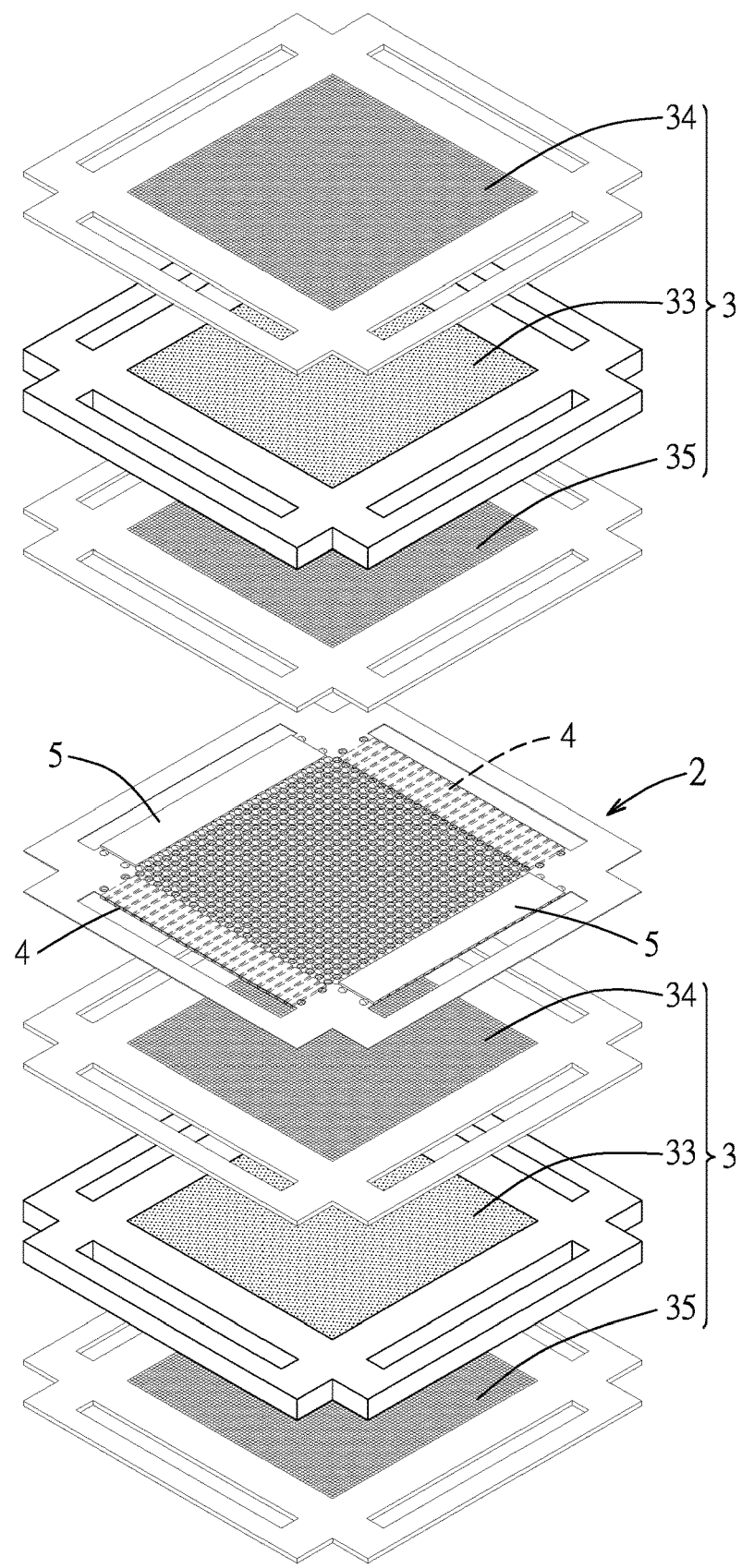
FIG. 5 is a perspective exploded view of the first embodiment of the modular planar interconnect plate assembly sandwiched between a pair of planar cell units.
Figure 6:
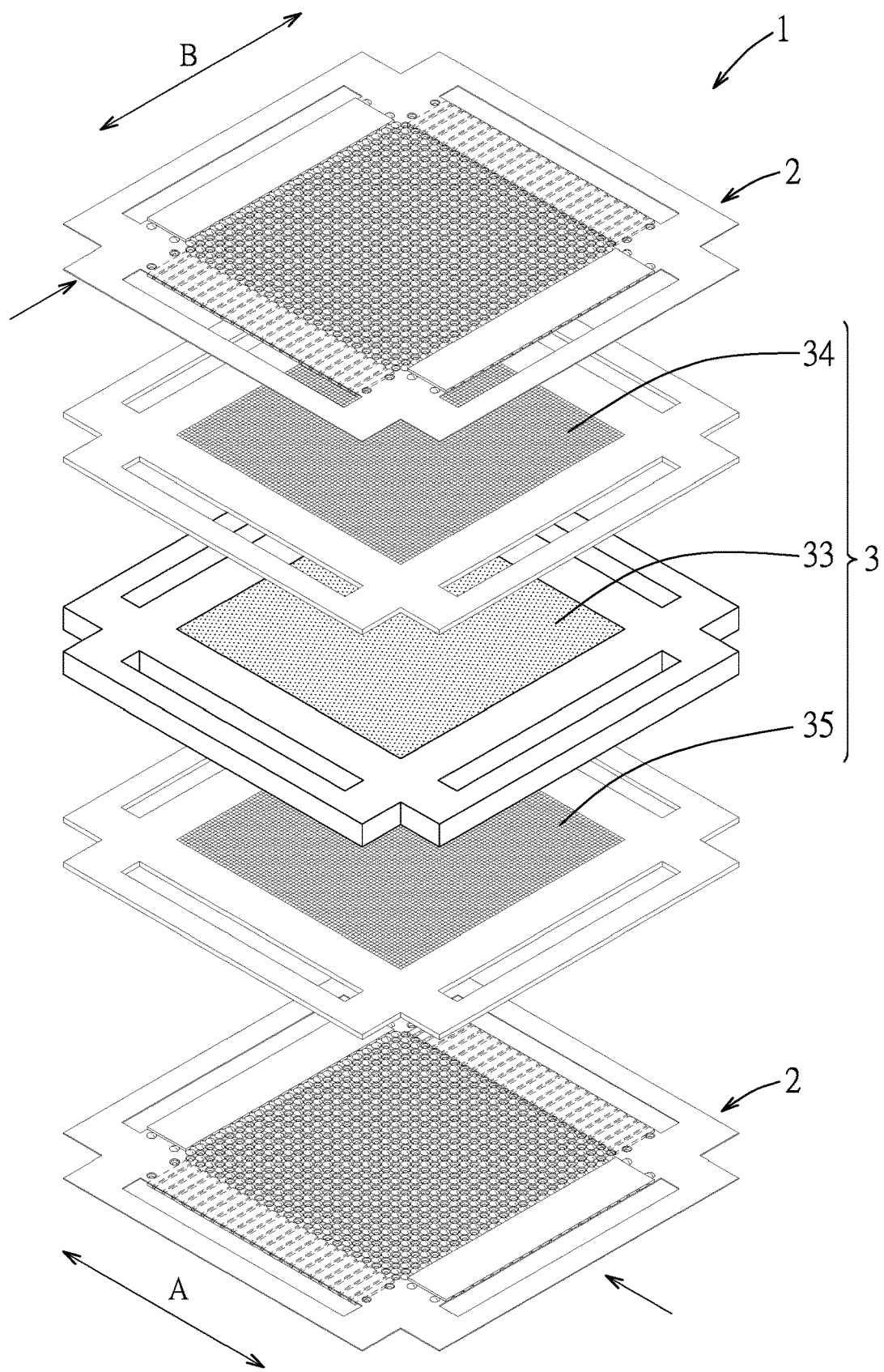
FIG. 6 is a perspective exploded view of a solid oxide fuel cell including two of the first embodiment of the modular planar interconnect plate assembly according to the disclosure.
Figure 7:
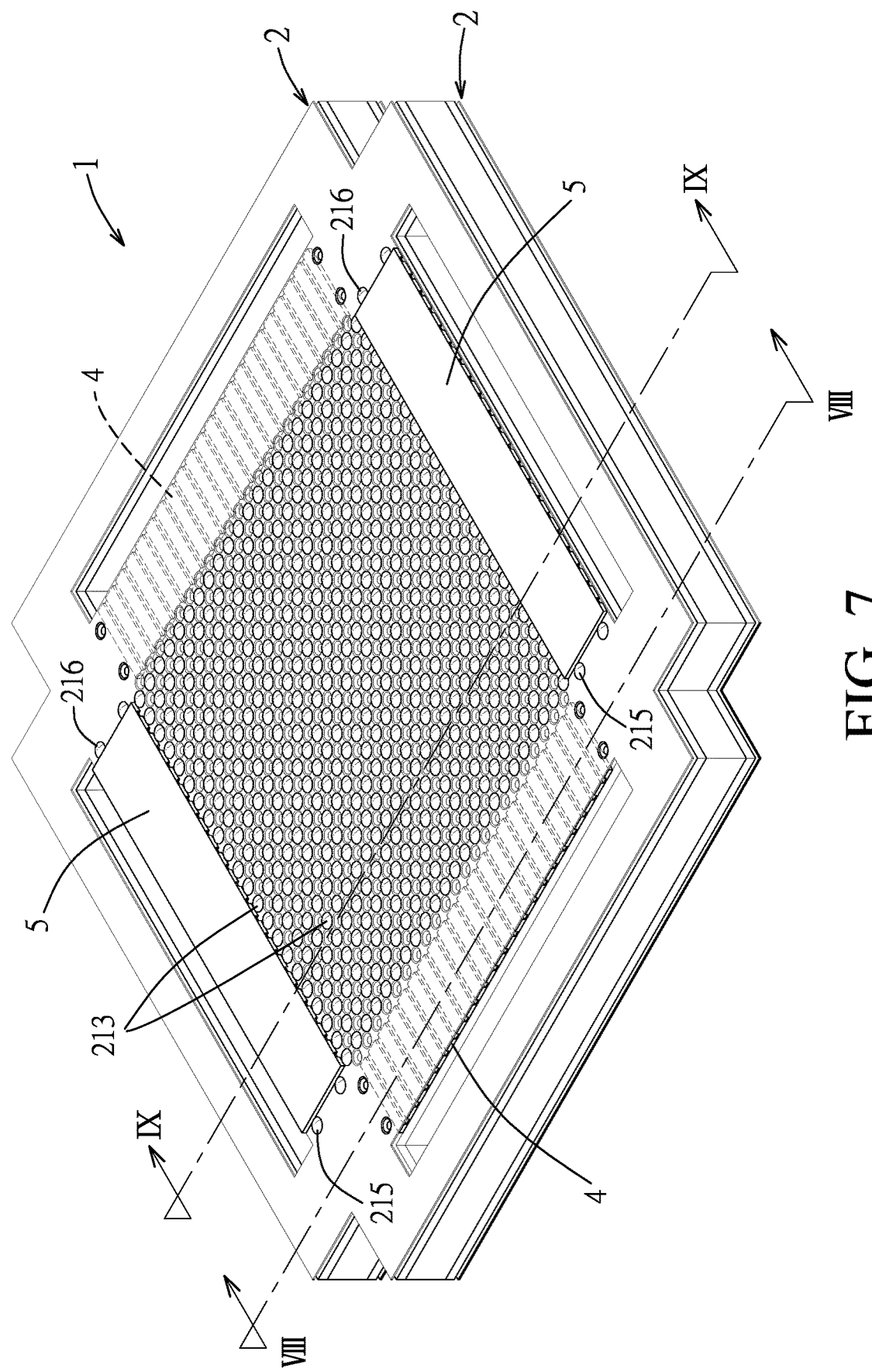
FIG. 7 is a perspective view of the solid oxide fuel cell of FIG. 6.
Figure 8:
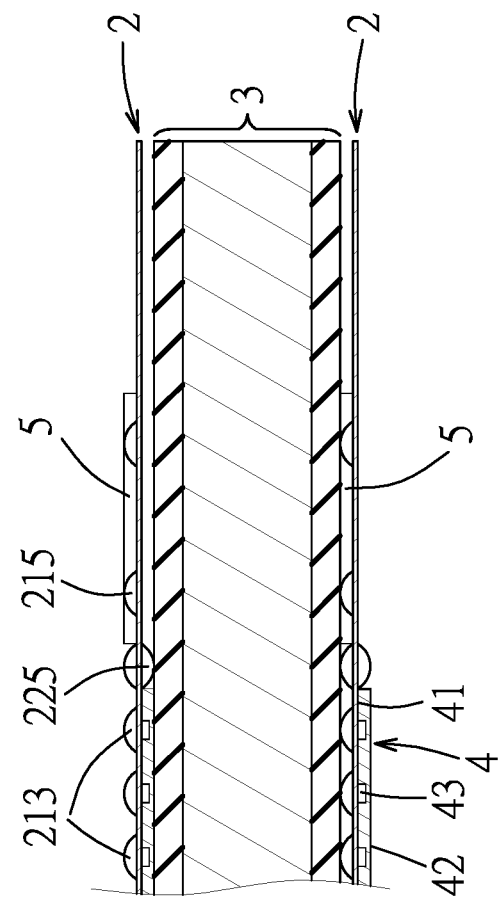
FIG. 8 is a schematic sectional view of the solid oxide fuel cell of FIG. 7 taken along line VIII-VIII.
Figure 8:
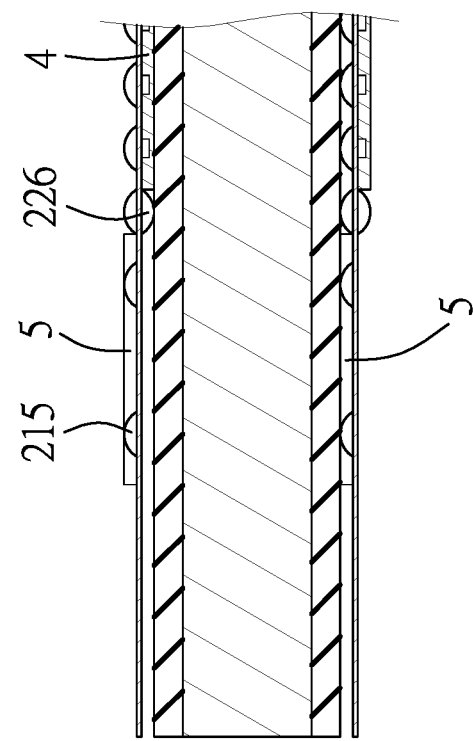
Figure 9:
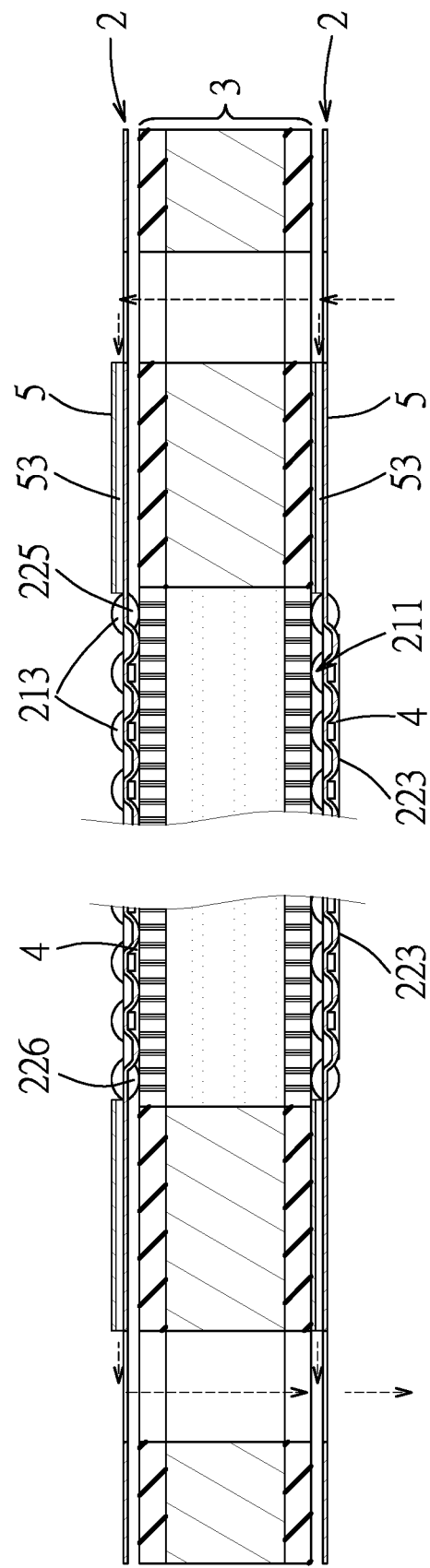
FIG. 9 is a schematic sectional view of the solid oxide fuel cell of FIG. 7 taken along line IX-IX.

Referring to FIG. 5, the first embodiment of the modular planar interconnect plate 2 is shown to be sandwiched between a pair of planar cell units 3. Each of the planar cell units 3 includes an anode web 34, a cathode web 35, and a planar cell body 33 sandwiched between the anode and cathode webs 34, 35.

Referring to FIGS. 6 to 9, a solid oxide fuel cell 1 includes two modular planar interconnect plates 2 and a planar cell unit 3 sandwiched therebetween.

Each of the modular planar interconnect plates 2 is the first embodiment of the modular planar interconnect plate 2 described above.

The anode web 34 is sandwiched between the planar cell body 33 and one of the two modular planar interconnect plates 2. The cathode web 35 is sandwiched between the planar cell body 33 and the other one of the two modular planar interconnect plates 2.

Figure 10:
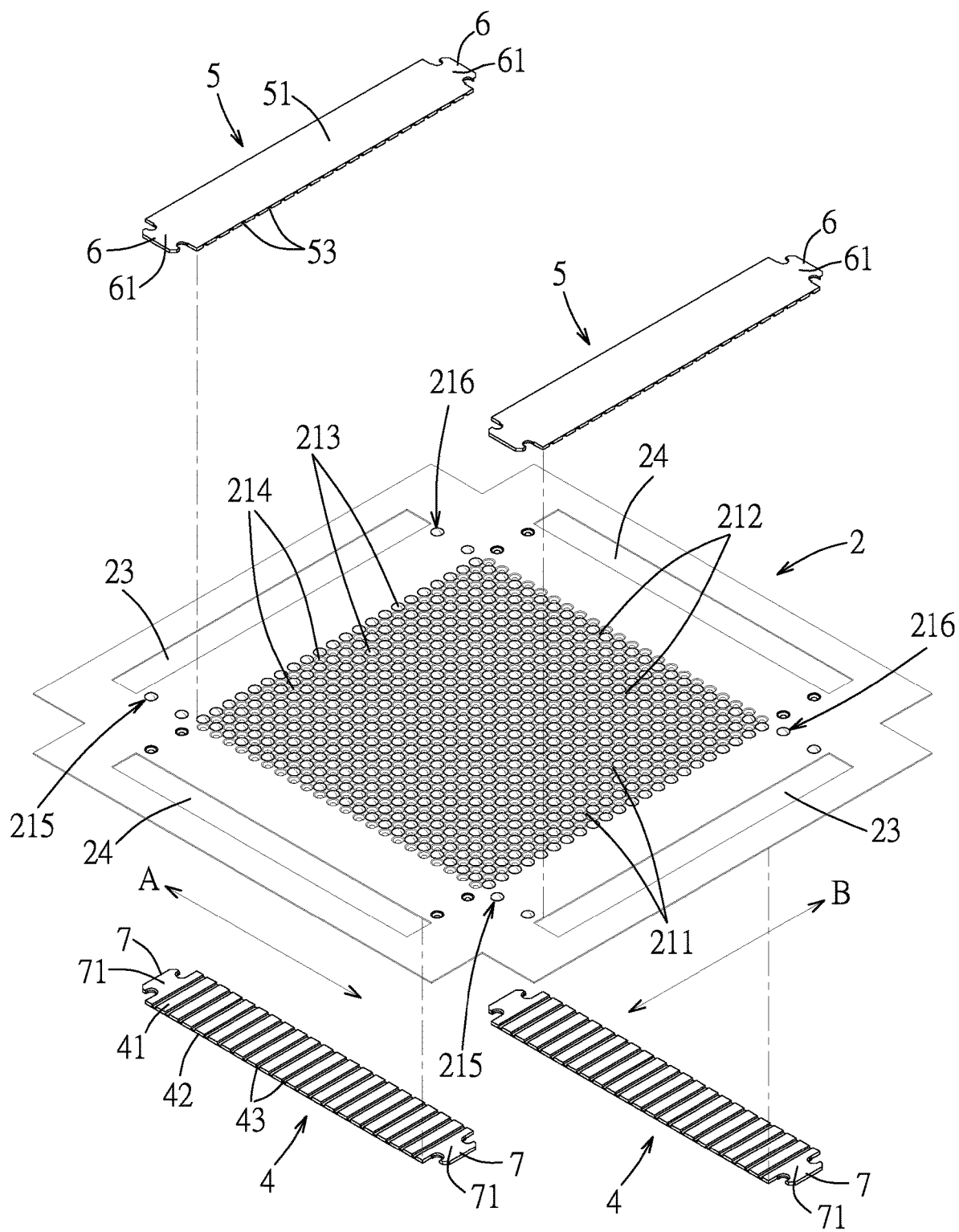
FIG. 10 is a perspective exploded view of a second embodiment of the modular planar interconnect plate assembly according to the disclosure.
Figure 11:
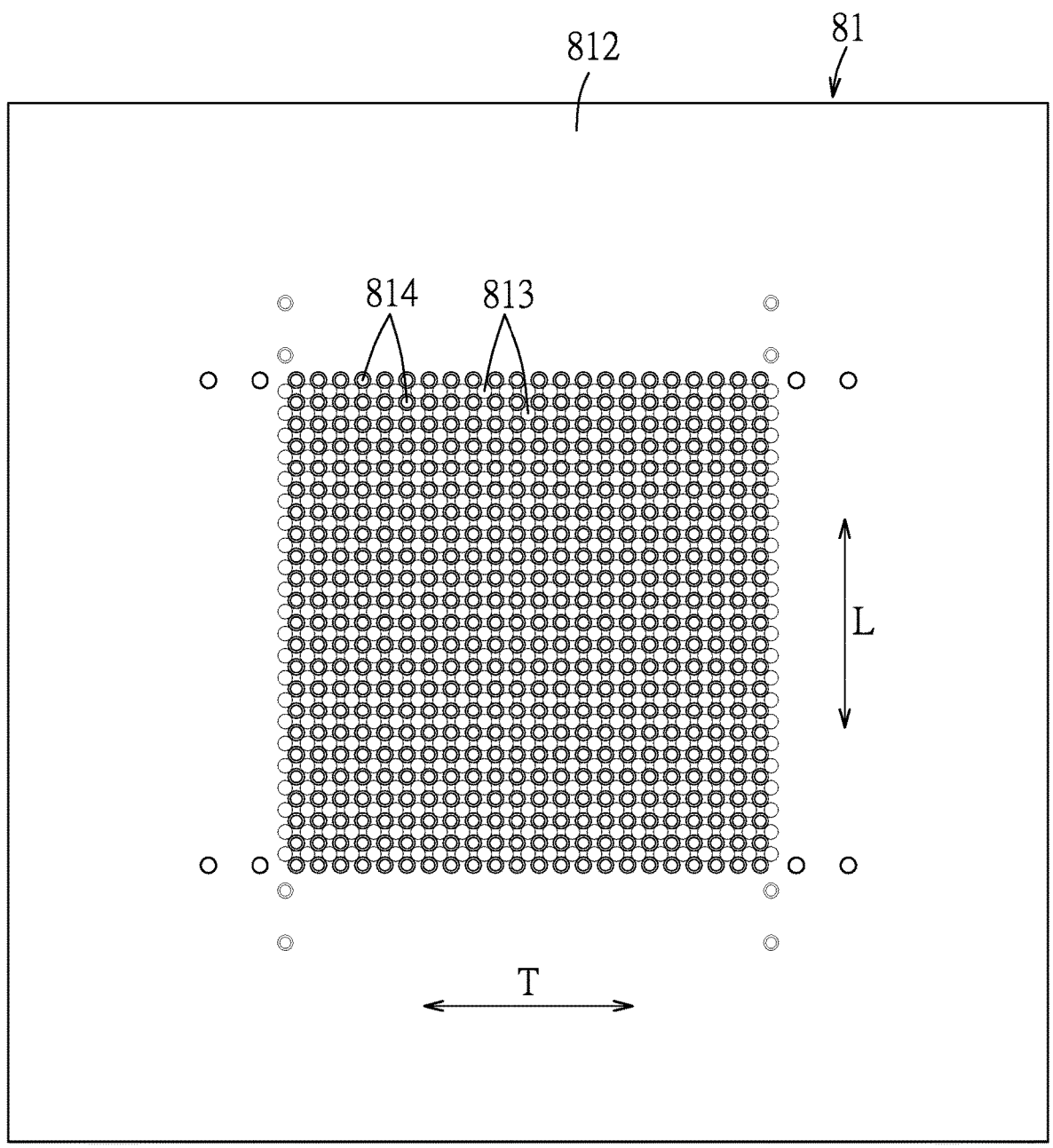
FIG. 11 is a schematic bottom view of an upper die of an embodiment of a stamping assembly according to the disclosure.
Figure 12:
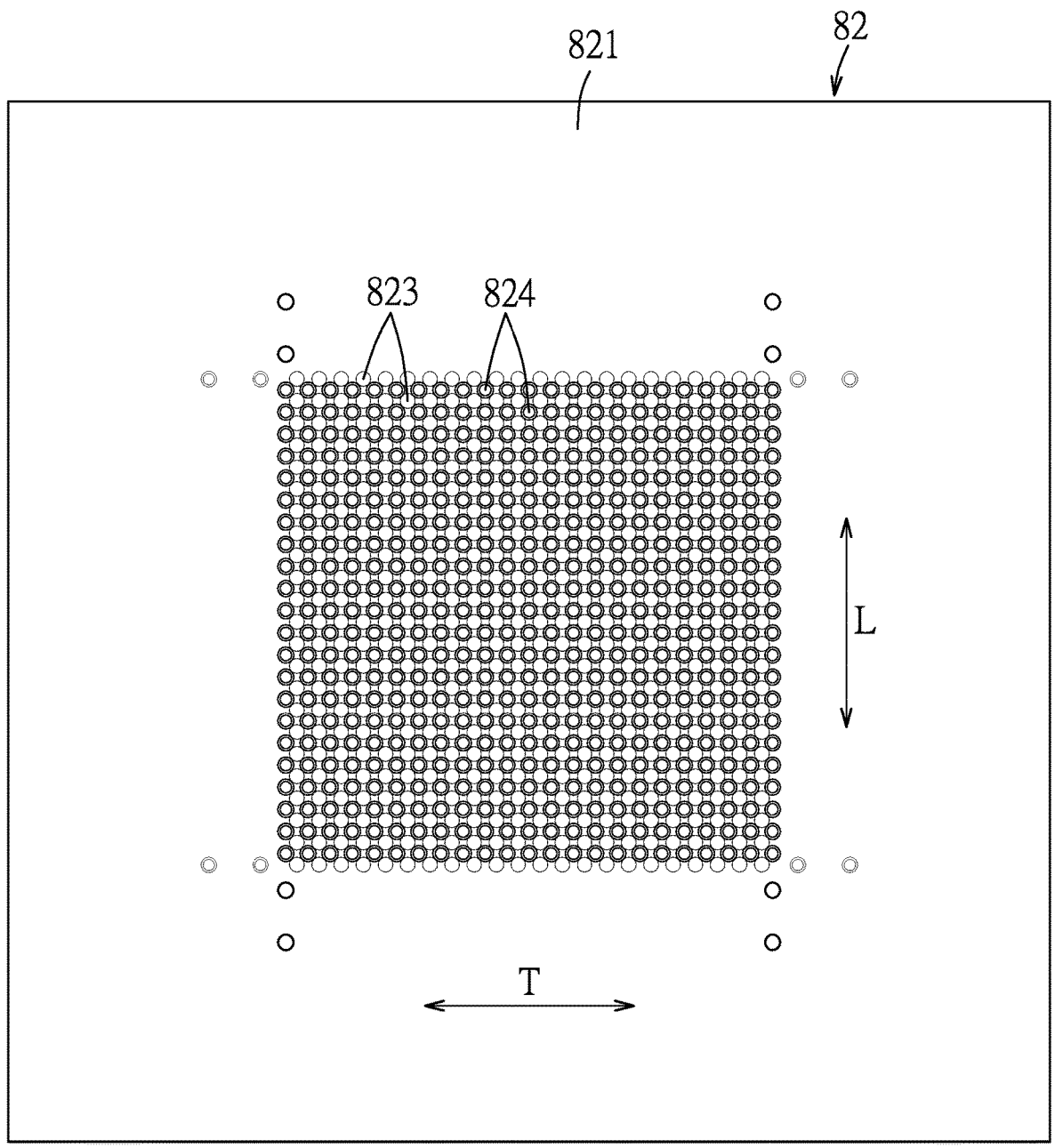
FIG. 12 is a schematic top view of a lower die of the embodiment of the stamping assembly according to the disclosure.
Figure 13:
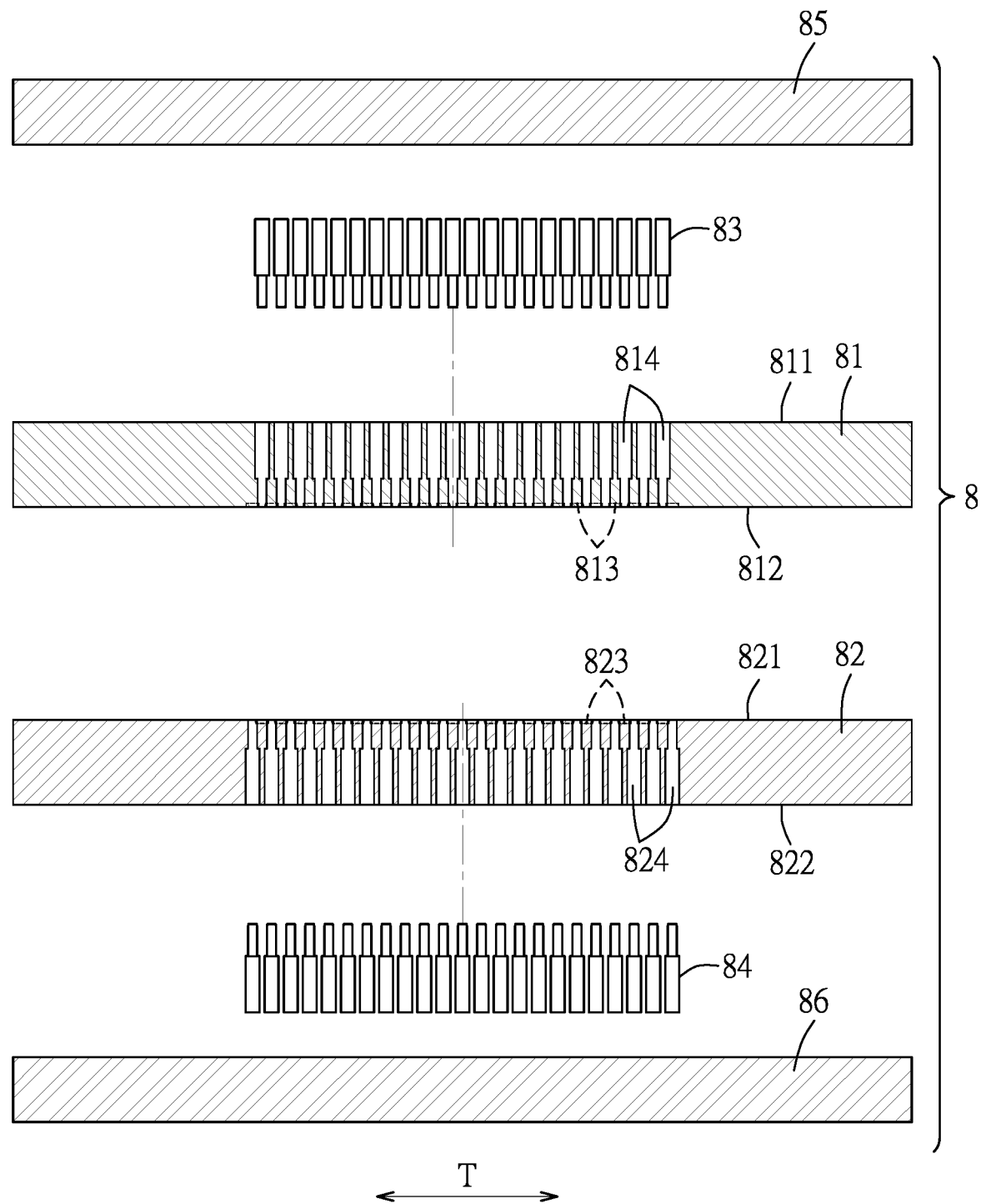
FIG. 13 is a schematic sectional view of the embodiment of the stamping assembly according to the disclosure.
Figure 14:
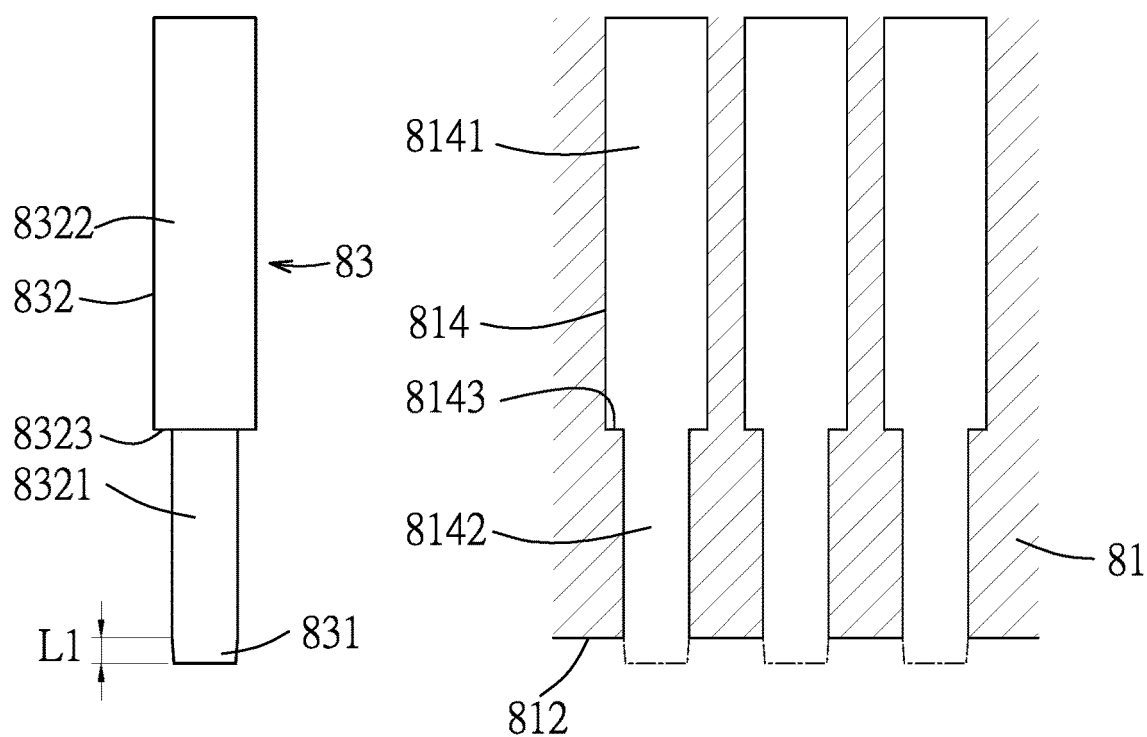
FIG. 14 is a partially enlarged drawing of FIG. 13, illustrating a first pin, and a second pin of the embodiment of the stamping assembly according to the disclosure.
Figure 14:
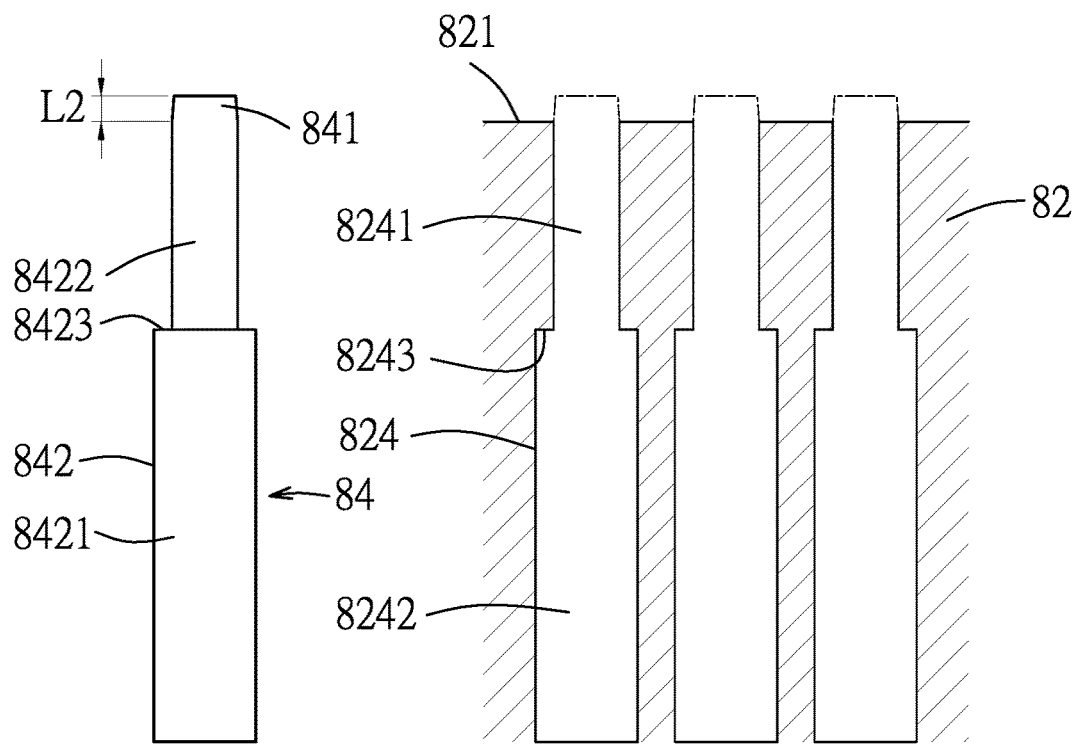

Referring to FIG. 10, a second embodiment of the modular planar interconnect plate assembly for a solid oxide fuel cell 1 is similar to the first embodiment of the modular planar interconnect plate assembly, except that in the second embodiment of the modular planar interconnect plate assembly, each of the upper elongation plates 5 has a length not larger than the first pre-determined distance, and each of the lower elongation plates 4 has a length not larger than the second pre-determined distance. In addition, the second embodiment of the modular planar interconnect plate assembly includes a pair of upper lug inserts 6 and a pair of lower lug inserts 7.

Each of the upper lug inserts 6 is disposed to join to a corresponding one of two ends of each of the upper elongation plates 5 with an upper juncture region 61. The upper juncture region 61 is configured to have a smaller width so as to permit the upper juncture region 61 to be fitted between the upper retaining protrusions of each of the front upper retaining protrusion unit 215 and the rear upper retaining protrusion unit 216.

Each of the lower lug inserts 7 is disposed to join to a corresponding one of two ends of each of the lower elongation plates 4 with a lower juncture region 71. The lower juncture region 71 is configured to have a smaller width so as to permit the lower juncture region 71 to be fitted between the lower retaining protrusions of each of the right lower retaining protrusion unit 225 and the left lower retaining protrusion unit 226.

Referring to FIGS. 11 to 14, the method for preparing the modular planar interconnect plate 2 for a solid oxide fuel cell 1 according to the disclosure may be implemented with a stamping assembly 8 according to the disclosure. An embodiment of the stamping assembly 8 includes an upper die 81, a lower die 82, a plurality of first pins 83, a plurality of second pins 84, a top cover plate 85, and a bottom cover plate 86.

The upper die 81 includes an upper surface 811, a lower surface 812 opposite to the upper surface 811, a plurality of columns of lower depressions 813 on the lower surface 812, and a plurality of columns of first guiding holes 814 extending from the lower surface 812 to the upper surface 811. The columns of the lower depressions 813 are displaced from each other in a transverse direction (T). Each of the columns of the lower depressions 813 includes a plurality of the lower depressions 813 which are displaced from each other in a longitudinal direction (L). Each of the columns of the first guiding holes 814 is disposed between two adjacent ones of the columns of the lower depressions 813 and includes a plurality of the first guiding holes 814 that are staggered with the lower depressions 813 of an adjacent one of the columns of the lower depressions 813. Each of the first guiding holes 814 is configured to have a first upper hole segment 8141, a first lower hole segment 8142 with a diameter smaller than that of the first upper hole segment 8141, and a first inner abutment shoulder 8143 formed therebetween.

The lower die 82 includes a top surface 821, a bottom surface 822 opposite to the top surface 821, a plurality of columns of top depressions 823 disposed on the top surface 821, and a plurality of columns of second guiding holes 824 extending from the bottom surface 822 to the top surface 821. Each of the top depressions 823 is disposed to register with a corresponding one of the first guiding holes 814. Each of the second guiding holes 824 is disposed to register with a corresponding one of the lower depressions 813. Each of the second guiding holes 824 is configured to have a second upper hole segment 8241, a second lower hole segment 8242 with a diameter larger than that of the second upper hole segment 8241, and a second inner abutment shoulder 8243 formed therebetween.

Each of the first pins 83 has a first pin head 831 and a first pin body 832, and is brought into fitting engagement with a corresponding one of the first guiding holes 814 while permitting the first pin head 831 to extend outwardly of the lower surface 812 of the upper die 81 by a first predetermined length (L1). The first pin body 832 is configured to have a first lower pin segment 8321, a first upper pin segment 8322 with a diameter larger than that of the first lower pin segment 8321, and a first outer abutment shoulder 8323 formed therebetween such that once each of the first pins 83 is brought into fitting engagement with a corresponding one of the first guiding holes 814, the first outer abutment shoulder 8323 is abutted against the first inner abutment shoulder 8143, thereby keeping the first pin head 831 with the first predetermined length (L1). Each of the second pins 84 has a second pin head 841 and a second pin body 842, and is brought into fitting engagement with a corresponding one of the second guiding holes 824 while permitting the second pin head 841 to extend outwardly of the top surface 821 of the lower die 82 by a second predetermined length (L2). The second pin body 842 is configured to have a second lower pin segment 8421, a second upper pin segment 8422 with a diameter smaller than that of the second lower pin segment 8321, and a second outer abutment shoulder 8423 formed therebetween such that once each of the second pins 84 is brought into fitting engagement with a corresponding one of the second guiding holes 824, the second outer abutment shoulder 8423 is abutted against the second inner abutment shoulder 8243 thereby keeping the second pin head 841 with the second predetermined length (L2).

The top cover plate 85 is disposed on the upper surface 811 of the upper die 81 for pressing against the first pin body 832 of each of the first pins 83.

The bottom cover plate 86 is disposed on the bottom surface 822 of the lower die 82 for pressing against the second pin body 842 of each of the second pins 84.

The metal blank sheet 2' is placed between the bottom surface 812 of the upper die 81 installed with the first pins 83 and the top surface 821 of the lower die 82 installed with the second pins 84. The upper main channels 211 and the lower main channels 221 may thus be simultaneously formed by stamping the main region 21' of the metal blank sheet 2'.

As described above, the method for preparing a modular planar interconnect plate 2 according to the disclosure simultaneously forms the upper main channels 211, each of which is defined between two adjacent ones of the columns of the upper protrusions 213, and the lower main channels 221, each of which is defined between two adjacent ones of the columns of the lower protrusions 223, by stamping the main region 21' of the metal blank sheet 2'. The upper depressions 214 allow the oxygen-containing fluid to flow and fluctuate along each of the upper main channels 211, and the lower depressions 224 allow the fuel fluid to flow and fluctuate along each of the lower main channels 221. In addition, the main region 21' of the metal blank sheet 2' is also simultaneously formed with the upper auxiliary channels 212, each of which is defined between two adjacent ones of the rows of the upper protrusions 213, and the lower auxiliary channels 222, each of which is defined between two adjacent ones of the columns of the lower protrusions 223, to allow the oxygen-containing fluid and the fluid fuels to flow to adjacent ones of the upper main channels 211 or adjacent ones of the lower main channels 221, respectively. Therefore, the modular planar interconnect plate 2 of disclosure can be made with a smaller thickness (e.g., 0.3 mm) to avoid the aforementioned disadvantages of the conventional art.

In sum, the method for preparing a modular planar interconnect plate for a solid oxide fuel cell 1 according to of the disclosure is free of mechanical engraving, and is implemented by stamping the metal blank sheet 2'. The modular planar interconnect plate 2 can be formed with the upper protrusions 213, the lower depressions 224, the lower protrusions 223, and the upper depressions 214 at a relatively low production cost and a relatively high production rate. In addition, since the oxygen-containing fluid and the fuel fluid can flow and fluctuate along each of the upper main channels 211 and each of the lower main channels 221, respectively, the oxygen-containing fluid and the fuel fluid may fully contact the planar cell unit 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A modular planar interconnect plate assembly for a solid oxide fuel cell, comprising
    a modular planar interconnect plate formed with a plurality of upper main channels which extend in a longitudinal direction and which are displaced from each other in a transverse direction, and a plurality of lower main channels which extend in the transverse direction and which are displaced from each other in the longitudinal direction, the modular planar interconnect plate being prepared by a method including the steps of:
(a) providing a metal blank sheet which has a main region, and a circumferential region surrounding the main region, the circumferential region of the metal blank sheet including a right side area, a left side area opposite to the right side area in the longitudinal direction, a front side area, and a rear side area opposite to the front side area in the transverse direction;
(b) stamping the main region of the metal blank sheet to form
   a plurality of columns of upper protrusions on an upper surface of the main region of the metal blank sheet, the columns of the upper protrusions being displaced from each other in the transverse direction such that two adjacent ones of the columns of the upper protrusions define in-between a corresponding one of the upper main channels, each of the columns of the upper protrusions including a plurality of the upper protrusions which are displaced from each other in the longitudinal direction, and
   a plurality of columns of lower depressions on a lower surface of the main region of the metal blank sheet, the columns of the lower depressions being displaced from each other in the transverse direction, each of the columns of the lower depressions including a plurality of the lower depressions which are displaced from each other in the longitudinal direction,
   wherein a front upper retaining protrusion unit and a rear upper retaining protrusion unit are formed on an upper surface of each of the right side area and the left side area of the circumferential region of the main region, and are spaced apart from each other in the transverse direction by a first predetermined distance, each of the front upper retaining protrusion unit and the rear upper retaining protrusion unit including a pair of upper retaining protrusions; and
(c) stamping the main region of the metal blank sheet to form
   a plurality of rows of lower protrusions on a lower surface of the main region of the metal blank sheet, the rows of the lower protrusions being displaced from each other in the longitudinal direction such that two adjacent ones of the rows of the lower protrusions define in-between a corresponding one of the lower main channels, each of the rows of the lower protrusions including a plurality of the lower protrusions which are displaced from each other in the transverse direction, and
   a plurality of rows of the upper depressions on the upper surface of the main region of the metal blank sheet, the rows of the upper depressions being displaced from each other in the longitudinal direction, each of the rows of the upper depressions including a plurality of the upper depressions which are displaced from each other in the transverse direction,
   wherein a right lower retaining protrusion unit and a left lower retaining protrusion unit are formed on a lower surface of each of the front side area and the rear side area of the circumferential region of the main region, and are spaced apart from each other in the longitudinal direction by a second predetermined distance, each of the right lower retaining protrusion unit and the left lower retaining protrusion unit including a pair of lower retaining protrusions;
a pair of upper elongation plates each of which includes a top surface and a bottom surface, and each of which has a length larger than the first predetermined distance so as to permit said upper elongation plates to be respectively retained between said front and rear upper retaining protrusion units of the right side area and between said front and rear upper retaining protrusion units of the left side area, each of said upper elongation plates having in said bottom surface a plurality of first grooves which are displaced from each other in a lengthwise direction and which are arranged such that said first grooves are fluidly communicated with said upper main channels and such that said top surface of each of said upper elongation plates is flush with the topmost of each of said upper protrusions; and
a pair of lower elongation plates each of which includes a top surface and a bottom surface, and each of which has a length larger than the second predetermined distance so as to permit said lower elongation plates to be respectively retained between said right and left lower retaining protrusion units of the front side area and between said right and left lower retaining protrusion units of the rear side area, each of said lower elongation plates having in said top surface a plurality of second grooves which are displaced from each other in a lengthwise direction and which are arranged such that said second grooves are fluidly communicated with the lower main channels and such that said bottom surface of each of said lower elongation plates is flush with the bottommost of each of said lower protrusions.

2. The modular planar interconnect plate assembly according to claim 1, wherein said first grooves are respectively aligned with said upper main channels, and said second grooves are respectively aligned with the lower main channels.

3. The modular planar interconnect plate assembly according to claim 1, wherein said modular planar interconnect plate further includes
   a pair of first slots which are formed in a right marginal area and a left marginal area that are disposed rightwardly and leftwardly of the right side area and the left side area, respectively; and
   a pair of second slots which are formed in a front marginal area and a rear marginal area that are disposed frontwardly and rearwardly of the front side area and the rear side area, respectively.

4. A modular planar interconnect plate assembly for a solid oxide fuel cell, comprising
   a modular planar interconnect plate formed with a plurality of upper main channels which extend in a longitudinal direction and which are displaced from each other in a transverse direction, and a plurality of lower main channels which extend in the transverse direction and which are displaced from each other in the longitudinal direction, the modular planar interconnect plate being prepared by a method including the steps of:
   (a) providing a metal blank sheet which has a main region, and a circumferential region surrounding the main region, the circumferential region of the metal blank sheet including a right side area, a left side area opposite to the right side area in the longitudinal direction, a front side area, and a rear side area opposite to the front side area in the transverse direction;

(b) stamping the main region of the metal blank sheet to form a plurality of columns of upper protrusions on an upper surface of the main region of the metal blank sheet, the columns of the upper protrusions being displaced from each other in the transverse direction such that two adjacent ones of the columns of the upper protrusions define in-between a corresponding one of the upper main channels, each of the columns of the upper protrusions including a plurality of the upper protrusions which are displaced from each other in the longitudinal direction, and a plurality of columns of lower depressions on a lower surface of the main region of the metal blank sheet, the columns of the lower depressions being displaced from each other in the transverse direction, each of the columns of the lower depressions including a plurality of the lower depressions which are displaced from each other in the longitudinal direction, wherein a front upper retaining protrusion unit and a rear upper retaining protrusion unit are formed on an upper surface of each of the right side area and the left side area of the circumferential region of the main region, and are spaced apart from each other in the transverse direction by a first predetermined distance, each of the front upper retaining protrusion unit and the rear upper retaining protrusion unit including a pair of upper retaining protrusions; and (c) stamping the main region of the metal blank sheet to form a plurality of rows of lower protrusions on a lower surface of the main region of the metal blank sheet, the rows of the lower protrusions being displaced from each other in the longitudinal direction such that two adjacent ones of the rows of the lower protrusions define in-between a corresponding one of the lower main channels, each of the rows of the lower protrusions including a plurality of the lower protrusions which are displaced from each other in the transverse direction, and a plurality of rows of the upper depressions on the upper surface of the main region of the metal blank sheet, the rows of the upper depressions being displaced from each other in the longitudinal direction, each of the rows of the upper depressions including a plurality of the upper depressions which are displaced from each other in the transverse direction, wherein a right lower retaining protrusion unit and a left lower retaining protrusion unit are formed on a lower surface of each of the front side area and the rear side area of the circumferential region of the main region, and are spaced apart from each other in the longitudinal direction by a second predetermined distance, each of the right lower retaining protrusion unit and the left lower retaining protrusion unit including a pair of lower retaining protrusions;

a pair of upper elongation plates each of which includes a top surface and a bottom surface, and each of which has a length not larger than the first predetermined distance, each of said upper elongation plates having in said bottom surface a plurality of first grooves which are displaced from each other in a lengthwise direction and which are arranged such that said first grooves are fluidly communicated with said upper main channels and such that said top surface of each of said upper elongation plates is flush with the topmost of each of said upper protrusions;

a pair of lower elongation plates each of which includes a top surface and a bottom surface, and each of which has a length not larger than the second predetermined distance, each of said lower elongation plates having in said top surface a plurality of second grooves which are displaced from each other in a lengthwise direction and which are arranged such that said second grooves are fluidly communicated with the lower main channels and such that said bottom surface of each of said lower elongation plates is flush with the bottommost of each of said lower protrusions;

a pair of upper lug inserts each of which is disposed to join to a corresponding one of two ends of each of said upper elongation plates with an upper juncture region, said upper juncture region being configured to have a smaller width so as to permit said upper juncture region to be fitted between said upper retaining protrusions of each of said front upper retaining protrusion unit and said rear upper retaining protrusion unit; and a pair of lower lug inserts each of which is disposed to join to a corresponding one of two ends of each of said lower elongation plates with a lower juncture region, said lower juncture region being configured to have a smaller width so as to permit said lower juncture region to be fitted between said lower retaining protrusions of each of said right lower retaining protrusion unit and said left lower retaining protrusion unit.

5. The modular planar interconnect plate assembly according to claim 4, wherein said first grooves are respectively aligned with said upper main channels, and said second grooves are respectively aligned with the lower main channels.

6. The modular planar interconnect plate assembly according to claim 4, wherein said modular planar interconnect plate further includes a pair of first slots which are formed in a right marginal area and a left marginal area that are disposed rightwardly and leftwardly of the right side area and the left side area, respectively; and a pair of second slots which are formed in a front marginal area and a rear marginal area that are disposed frontwardly and rearwardly of the front side area and the rear side area, respectively.

* * * * *